April 24, 1951      C. E. JOHANSSON      2,549,907
SHIPPING CONTAINER FOR AIRCRAFT ENGINES
Filed Aug. 5, 1948      2 Sheets-Sheet 2
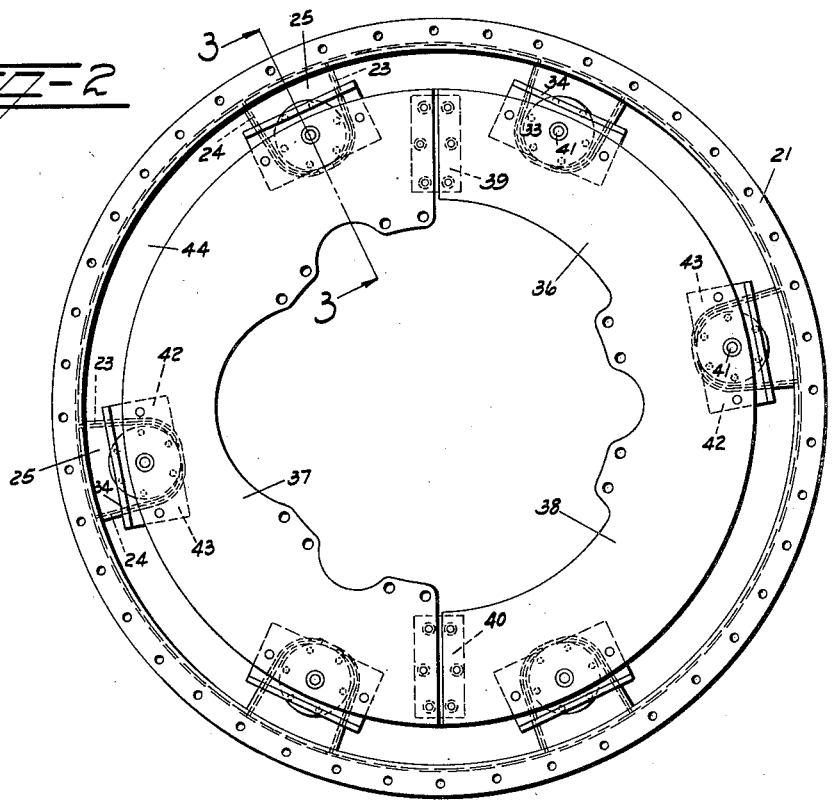
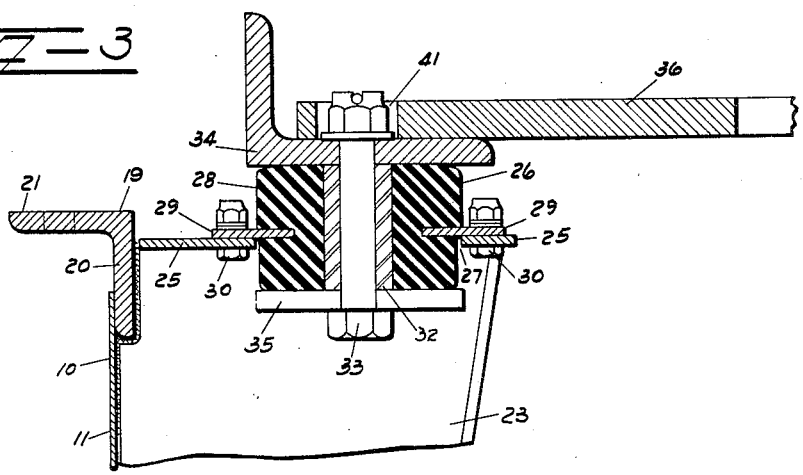
~INVENTOR~
CARL E. JOHANSSON
By ~Samuel Reese
~ATTY.~

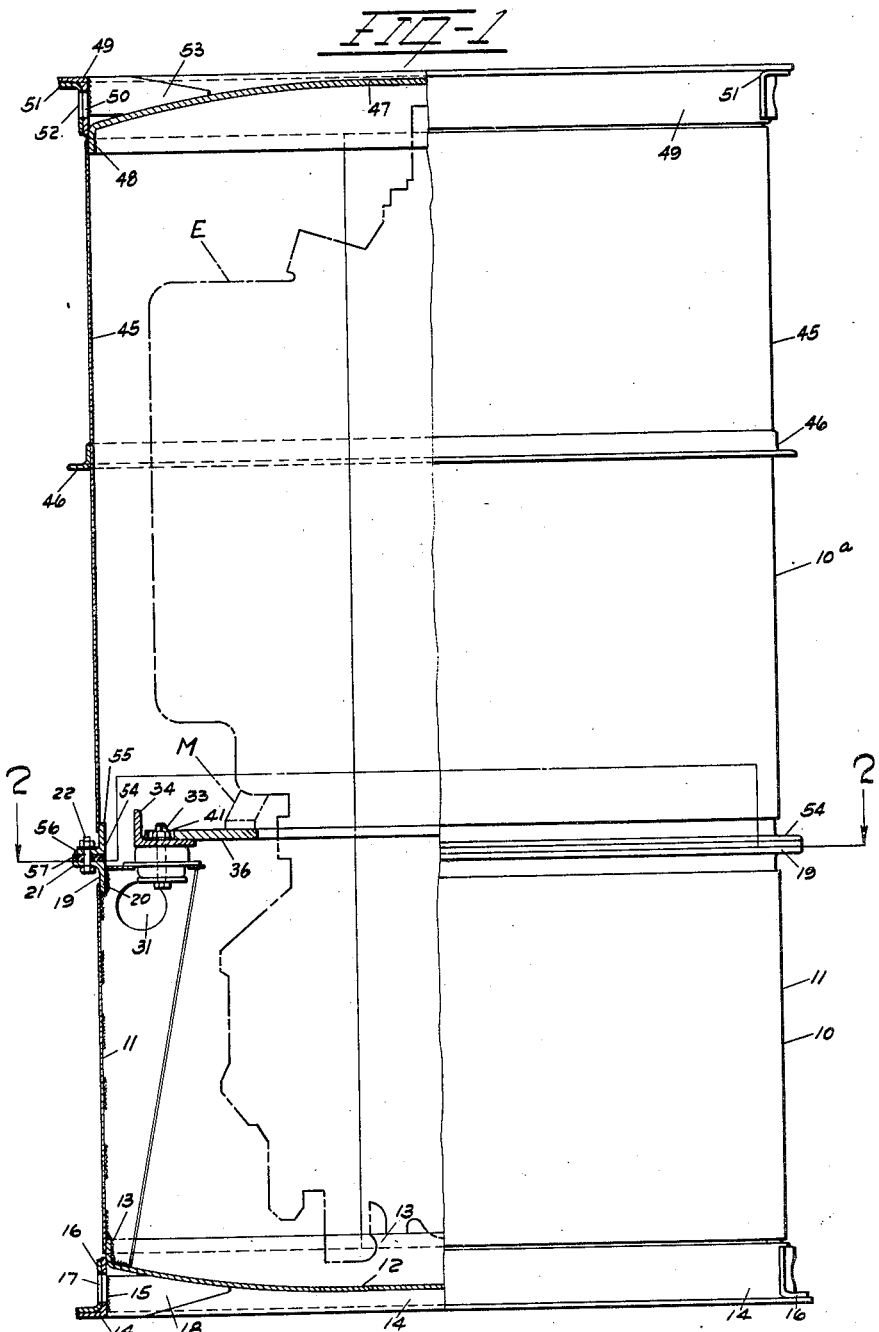

Patented Apr. 24, 1951

2,549,907

UNITED STATES PATENT OFFICE 2,549,907

SHIPPING CONTAINER FOR AIRCRAFT ENGINES

Carl E. Johansson, Cleveland, Ohio, assignor to The Youngstown Steel Door Company, Cleveland, Ohio, a corporation of Ohio Application August 5, 1948, Serial No. 42,592

10 Claims. (Cl. 206—46)

1

This invention relates to shipping containers for aircraft engines.

The broad objects of this invention are to provide shipping containers for engines which shall protect the engines, utilize engine supports disposed wholly within the containers, yieldingly support the engines, simplify and facilitate the securement of the engine therein, employ supports which shall serve as reinforcements, reduce the number of supports required for the containers, require the least number of container sections, and be weathertight and capable of being dropped into a body of water and floated ashore.

A further object is to effect the broad purposes enumerated above by a structure which shall eliminate a part heretofore used, reduce weight and fabrication costs, expedite the securement of engines therein, and which shall be adapted to engines of different peripheral contours.

Other objects of the invention will become clear as the description thereof proceeds.

In the drawings forming part of this specification:

Fig. 1 is an elevation partly in section of an aircraft engine shipping container embodying the instant invention and containing an aircraft engine shown diagrammatcially.

Fig. 2 is a horizontal section taken on line 2—2 of Fig. 1.

Fig. 3 is a vertical section taken on line 3—3 of Fig. 2.

Referring to the drawings, the container embodying the instant invention is formed of a lower section 10 and an upper section 10ª, the former section being constructed so as to yieldingly support an aircraft engine E and the latter section being adapted to be fastened to the lower section in order to completely cover the engine. The lower section 10 is formed of a metallic cylindrical wall 11, one end of which is closed by means of a dished end plate 12 formed with a peripheral skirt portion 13 which is secured as by means of welding to the inner face of the cylindrical wall. The portion of the container which is closed by the end plate or wall 12 is reinforced by means of an angle member 14 which surrounds the lower section and is secured as by means of welding to the skirt portion 13. Openings, such as 15, are formed in the reinforcing angle 14 which permit the insertion of hooks in order to raise the container. The loss of material in the angle members 14 occasioned by the provision of the openings 15 is compensated for by an angle member 16 which is formed with an opening 17 alined with the opening 15.

2

Additional reinforcement for the end wall 12 is provided by means of plate members such as 18 which are secured to the end wall and to the reinforcing angle 14 as by means of welding. The peripheral angle member 14 and the reinforcing angle and plates 16 and 18, respectively, serve to constitute a base for the container.

The other end of the container is open and the cylindrical wall 11 at this end is reinforced by means of a marginal angle member 19 disposed with its vertical leg 20 overlapping the inner face of the wall and secured thereto as by means of welding and its horizontal leg 21 directed outwardly of the wall. The latter leg is formed with a plurality of openings adapted to receive bolts such as 22 for the purpose of securing the upper section of the container upon the lower section.

In order to satisfactorily and yieldingly support an aircraft engine within the lower container section 10 a pluraltiy of brackets carrying resilient mountings are utilized. As shown in Fig. 2 of the drawings, six brackets are preferred although this number may be increased or decreased, if desired. The brackets are identical in construction and each comprises vertical plate members 23 and 24 secured to the angle member 19 and to the inner surface of the cylindrical wall 11 as by means of welding. As more clearly appears in Fig. 1 of the drawings the plate members 23 and 24 extend from the angle member 19 to the end wall 12 to which they are welded so that the end wall is utilized to carry a portion of the stresses imposed upon the brackets. The plate members 23 and 24 of the brackets are spanned by means of a plate member 25 which is secured to the members 23 and 24 and to the vertical leg 20 of the angle member 19 as by means of welding.

The spanning plate 25 is adapted to carry a resilient mounting 26. For this purpose the plate is formed with an opening 27 through which the mounting 26 extends. The mounting comprises a cylindrical plug of rubber 28 within which a plate member 29 is imbedded and vulcanized. The plate member 29 lies between the upper and lower edges of the rubber plug 28 and extends beyond said plug as clearly shown in Fig. 3 of the drawings. The plate member 29 is formed with a plurality of openings alined with corresponding openings formed in the spanning plate 25 so that the plate member 29 may be secured to the spanning plate 25 as by means of bolts 30. To facilitate the securement of the mounting upon the spanning plate 25, openings such as 31 are formed in the bracket plates 23 and 24, these openings permitting the insertion and tightening of the securing bolts 30.

A sleeve 32 is vulcanized within the central portion of the rubber plug 28 and through this sleeve a bolt 33 is adapted to extend upwardly for the purpose of securing a bearing angle 34 upon the rubber plug. A washer 35 is interposed between the head of the bolt and the lower surface of the rubber plug.

To secure an aircraft engine upon the brackets, an adaptor ring 36 is fastened to the engine as by means of a plurality of engine mounts, one of which is shown diagrammatically at M. The outer edge of the adaptor ring 36 is preferably circular and the inner edge thereof has a contour conforming to that portion of the engine to which it is secured. In order that the adaptor ring may be utilized with engines having a relatively narrower waist portion and wider portions on each side of the waist portion, the adaptor ring is formed in sections such as 37 and 38 and these sections secured together by means of splice plates 39 and 40. After the adaptor ring has been secured to the engine the latter is lowered into the bottom section 10 of the container and the adaptor ring accurately positioned upon the flexible mounting 26 by projecting the upper ends of the bolts 33 into openings 41 formed in the adaptor ring. The adaptor ring is disposed upon the bearing angles 34 which as more clearly shown in Fig. 2 of the drawings extend beyond and terminate adjacent to the plate members 23 and 24 of the brackets as indicated at 42 and 43. The extending portions of the bearing angles are formed with openings adapted to correspond with openings formed in the adaptor ring so that the latter may be secured as by means of bolts or the like to the bearing angles. This securement is facilitated by the spacing of the outer edge of the adaptor ring a substantial distance from the wall of the lower container section as indicated at 44.

After the engine has been mounted upon the brackets as described above, it is covered by means of the upper container section 10a. This section is formed of a metallic cylindrical wall 45 reinforced by means of an intermediate angle member 46 and closed at one end by means of a dished end wall 47 formed with a peripheral skirt portion 48 secured as by means of welding to the inner face of the cylindrical wall. A peripheral reinforcing angle 49 is secured as by means of welding to the skirt portion 48 and is formed with openings such as 50 for the purpose of receiving a hoisting hook. The lost material occasioned by the forming of openings such as 50 is compensated for by an angle member 51 formed with openings such as 52 corresponding with the openings 50. Further reinforcement is provided for the closed end of the upper container section by means of plates such as 53.

The other end of the upper container section is open and is reinforced by means of a peripheral angle member 54 having a vertically disposed leg 55 secured to the inner surface of the cylindrical wall 45 as by means of welding and an outwardly extending horizontal leg 56. The latter is formed with openings adapted to be alined with openings formed in the horizontal leg 51 of the angle member 19 so that bolts such as 22 can extend through the alined openings and secure the upper and lower sections of the container together. In order to seal these sections, a gasket 57 is disposed between the horizontal legs 21 and 56.

The instant invention is an improvement on the invention disclosed in applicant's co-pending application Serial #589,003, filed April 18, 1945.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, an aircraft engine supported in said lower section, an adaptor ring secured to said engine, said ring extending from said engine into overlapping relationship with said metallic members, extending through said ring and said side portions of said metallic members for means securing said ring upon said flexible mountings, and means releasably securing the open ends of said sections together to enclose said engine.

2. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, an aircraft engine supported in said lower section, an adaptor ring secured to said engine, said ring being formed in sections which are spliced together and extend from said engine into overlapping relationship with said metallic members, means extending through said ring and said side portions of said metallic members for securing said ring upon said flexible mountings, and means releasably securing the open ends of said sections together to enclose said engine.

3. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, an aircraft engine supported in said lower section, an adaptor ring secured to said engine, said ring extending from said engine into overlapping relationship with said metallic members, said ring being spaced a substantial distance from the wall of said lower section, means extending through said ring and said side portions of said metallic members for securing said ring upon said flexible mountings, and means releasably securing the open ends of said sections together to enclose said engine.

4. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, the inner edges of said metallic members terminating substantially inwardly of said bracket, an aircraft engine supported in said lower section, an adaptor ring secured to said engine, said ring extending from said engine into overlapping relationship with said metallic members, means extending through said ring and said side portions of said metallic members for securing said ring upon said flexible mountings, and means releasably securing the open ends of said sections together to enclose said engine.

5. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, a bolt extending through and securing said resilient and metallic members of each mounting together, an aircraft engine supported in said lower section, an adaptor ring secured to said engine, openings formed in said ring, said adaptor ring extending from said engine into overlapping relationship with said metallic members, said bolts extending into said openings in said ring to position the latter upon said metallic members, means extending through said ring and said side portions of said metallic members for securing said ring upon said flexible mountings, and means releasably securing the open ends of said sections together to enclose said engine.

6. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, a bolt extending through and securing said resilient and metallic members of each mounting together, an aircraft engine supported in said lower section, an adaptor ring secured to said engine, openings formed in said ring, said adaptor ring extending from said engine into overlapping relationship with said metallic members, said ring being spaced a substantial distance from the wall of said lower section, said bolts extending into said openings in said ring to position the latter upon said metallic members, means extending through said ring and said side portions of said metallic portions for securing said ring upon said flexible mountings, and means releasably securing the open ends of said sections together to enclose said engine.

7. A shipping container for aircraft engines comprising upper and lower sections, each of said sections embodying a peripheral wall having one end closed and the other end open, spaced brackets carried by said lower section, each of said brackets comprising spaced vertical plates secured to the wall of said lower section and extending inwardly therefrom and a plate spanning said vertical plates and secured thereto, openings formed in said vertical plates, flexible mountings, and means securing said mountings upon said spanning plates, said securing means being accessible through said openings in said vertical plates.

8. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, said side portions of said members having openings therein adapted to receive fastening means, the open ends of said sections being adapted to be secured together.

9. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, the inner edges of said metallic members terminating substantially inwardly of said bracket, said side portions of said members having openings therein adapted to receive fastening means, the open ends of said sections being adapted to be secured together.

10. A shipping container for aircraft engines comprising upper and lower sections, each of said sections embodying a peripheral wall having one end closed and the other end open, spaced brackets lying within said lower section and secured to the wall thereof, flexible mountings secured upon said brackets, each of said mountings including a resilient member and a metallic member seated thereon and having side portions extending beyond and terminating adjacent to the sides of each bracket, a bolt extending through and securing said resilient and metallic members of each mounting together, said side portions of said members having openings therein adapted to receive fastening means, the open ends of said sections being adapted to be secured together.

CARL E. JOHANSSON.

REFERENCES CITED

The following references are of record in the file of this patent:

UNITED STATES PATENTS

| Number | Name | Date |
| --- | --- | --- |
| 2,376,317 | Wallerstein | May 15, 1945 |